US009725035B2

(12) United States Patent
Konet et al.

(10) Patent No.: US 9,725,035 B2
(45) Date of Patent: Aug. 8, 2017

(54) METHOD OF EMANATING A SOUND FROM A VEHICLE

(71) Applicant: Nissan North America, Inc., Franklin, TN (US)

(72) Inventors: Heather Konet, Canton, MI (US); Tsuyoshi Kanuma, Kanagawa (JP); Manabu Sato, Farmington Hills, MI (US); Toshiyuki Tabata, Kanagawa (JP); Andy Christensen, Livonia, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 0 days.

(21) Appl. No.: 14/872,987

(22) Filed: Oct. 1, 2015

(65) Prior Publication Data

US 2016/0023596 A1 Jan. 28, 2016

Related U.S. Application Data

(63) Continuation of application No. 13/402,090, filed on Feb. 22, 2012, now Pat. No. 9,150,153.

(51) Int. Cl.
*B60Q 1/50* (2006.01)
*B60Q 5/00* (2006.01)
(52) U.S. Cl.
CPC .................... *B60Q 5/008* (2013.01)
(58) Field of Classification Search
None
See application file for complete search history.

(56) References Cited

U.S. PATENT DOCUMENTS

| 5,612,673 A * | 3/1997 | Nunn | G08B 3/10 340/384.1 |
| 7,339,462 B1 * | 3/2008 | Diorio | H04S 7/30 340/456 |
| 8,204,243 B2 | 6/2012 | Smith | |
| (Continued) | | | |

FOREIGN PATENT DOCUMENTS

| JP | 2011-152842 A | 8/2011 |
| WO | 2011070630 A1 | 6/2011 |

OTHER PUBLICATIONS

Konet et al., "Development of Approaching Vehicle Sound for Pedestrians (VSP) for Quiet Electric Vehicles", Apr. 12, 2011, SAE International, USA.

*Primary Examiner* — Kerri McNally
*Assistant Examiner* — Renee Dorsey
(74) *Attorney, Agent, or Firm* — Global IP Counselors, LLP

(57) ABSTRACT

A method of emanating a sound from a vehicle comprising detecting a speed of the vehicle, and emanating a speed sound, including emanating a sound profile and changing at least one of a sound pressure level and a pitch of the sound profile in relation to the speed of the vehicle changing. The method further comprises ceasing emanation of the speed sound upon the speed of the vehicle increasing from below a first threshold to above the first threshold, and resuming emanation of the speed sound upon the speed of the vehicle decreasing from above a second threshold to below the second threshold, the second threshold being less than the first threshold.

20 Claims, 7 Drawing Sheets

(56) References Cited

U.S. PATENT DOCUMENTS

| | | |
|---|---|---|
| 8,779,935 B2 * | 7/2014 | Savchenko ............ B60Q 5/008 324/174 |
| 2002/0118103 A1 | 8/2002 | Tabe |
| 2005/0156727 A1 | 7/2005 | Golder |
| 2005/0275519 A1 | 12/2005 | Ferrone et al. |
| 2009/0146799 A1 | 6/2009 | Goldstein et al. |
| 2011/0144884 A1 | 6/2011 | Miah |
| 2011/0199199 A1 | 8/2011 | Perkins |

* cited by examiner

METHOD OF EMANATING A SOUND FROM A VEHICLE

CROSS-REFERENCE TO RELATED APPLICATION

This application is a continuation of U.S. patent application Ser. No. 13/402,090, filed on Feb. 22, 2012. The entire contents of U.S. patent application Ser. No. 13/402,090 is incorporated herein by reference.

BACKGROUND

Field of the Invention

The present invention generally relates to a system and method of emanating a sound from a vehicle. More specifically, the present invention relates to a system and method of emanating a sound from a vehicle based on intent to move the vehicle.

Background Information

Electric and hybrid vehicles are becoming increasingly popular for reasons such as rising fuel costs and environmental concerns. A secondary advantage of the shift toward widespread use of electric vehicles is the reduction of ambient noise which is emanated by an internal combustion engine (ICE) used in most vehicles today. With 100% electric power running the vehicle, generally only tire noise and some slight electric motor noise is generated during operation of fully electric vehicles. Although this greatly reduces noise pollution, this lack of noise can make it difficult for pedestrians to detect the presence of a vehicle. That is, pedestrians are highly reliant on ICE noise to detect the presence of vehicles, especially when the pedestrian is hearing or visually impaired.

One attempted solution to enable better pedestrian detection of the vehicle is to generate a vehicle sound for pedestrians (VSP). For example, a vehicle can be controlled to emit a synthetic ICE sound during operation of the vehicle, thereby enabling detection of the electric vehicle in the same way as ICE vehicles. Other attempts to generate sounds can include, for example, generating an unpleasant horn-like sound at an ambient noise frequency, or generating a sound having peaks at an ambient noise frequency.

SUMMARY

It has been discovered that it is desirable to control the vehicle to emit a VSP at appropriate times to warn pedestrians and to refrain from emitting a VSP at unnecessary times. For example, if a vehicle is idling in a driveway in the morning to warm up the passenger cabin on a cold day, the VSP being emitted may annoy neighbors trying to sleep. Also, if a driver is stopped in traffic on a hot day with the vehicle windows down, the driver and drivers of other vehicles may become annoyed hearing the VSP through the open windows. Furthermore, since the National Highway Traffic Safety Administration (NHTSA) may prohibit VSP systems from including turn off switches, a driver may be unable to temporarily disable the VSP system during times when VSP emission is unnecessary.

In view of the state of the known technology, one aspect of the present invention provides a method of emanating a sound from a vehicle comprising detecting a speed of the vehicle, and emanating a speed sound, including emanating a sound profile and changing at least one of a sound pressure level and a pitch of the sound profile in relation to the speed of the vehicle changing. The method further comprises ceasing emanation of the speed sound upon the speed of the vehicle increasing from below a first threshold to above the first threshold, and resuming emanation of the speed sound upon the speed of the vehicle decreasing from above a second threshold to below the second threshold, the second threshold being less than the first threshold.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
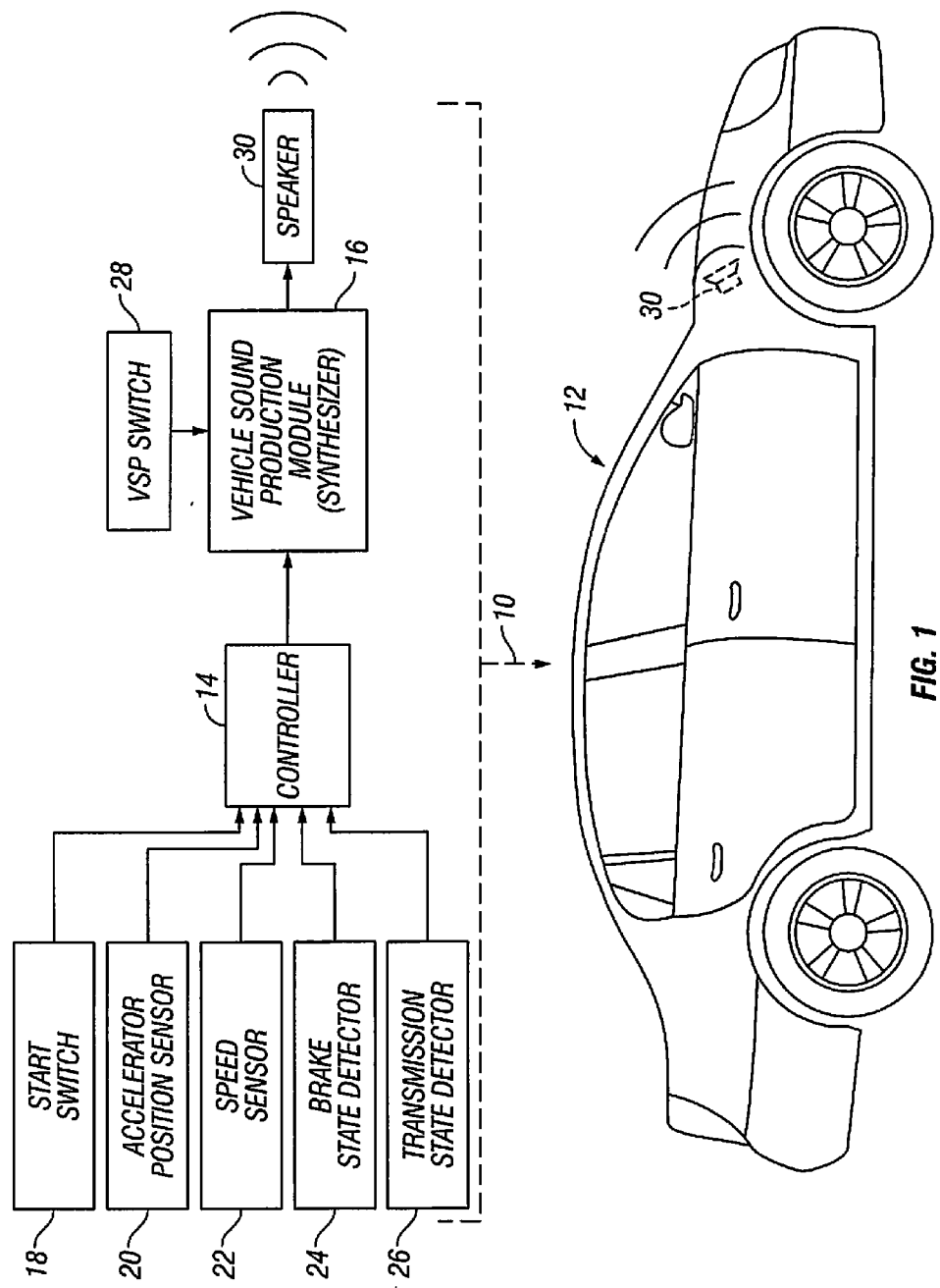
FIG. 1 is a schematic view illustrating an example of components of a system for emanating a sound from a vehicle according to a disclosed embodiment.

Referring initially to FIG. 1, a vehicle sound emanating system 10 for use in a vehicle 12 is illustrated in accordance with an embodiment of the present invention. The vehicle 12 can be an electric or hybrid vehicle as understood in the art, and can be any type of vehicle such as a car, truck, van, SUV and so on. The vehicle sound emanating system 10 includes a controller 14 and a vehicle sound production (VSP) module 16 that generates a sound that can serve as an audible alert as discussed in more detail below. As understood by one skilled in the art, the controller 14 preferably includes a microcomputer with a control program that controls the vehicle sound emanating system 10 as discussed herein. The controller 14 can also include other conventional components such as an input interface circuit, an output interface circuit, and storage devices such as a ROM (Read Only Memory) device and a RAM (Random Access Memory) device. The RAM and ROM store processing results and control programs that are run by the controller 14. The controller 14 is operatively coupled to the components of the vehicle sound emanating system 10, and to the components of the vehicle 12 as appropriate, in a conventional manner. It will be apparent to those skilled in the art from this disclosure that the precise structure and algorithms for the controller 14 can be any combination of hardware and software that will carry out the functions of the present invention.

The controller 14 receives signals from the start switch 18, accelerator position sensor 20, speed sensor 22, brake state detector 24 and transmission state detector 26, and controls the VSP module 16 based on those signals as discussed in more detail below. The vehicle sound emanating system 10 can further include a VSP switch 28 that provides on/off signals to the VSP module 16 that enables a user to turn the VSP module 16 on and off. The VSP module 16 provides signals to at least one audio component 30, such as a speaker arrangement, to cause the audio component 30 to generate an audible alert as discussed in more detail below. The terms "sound" and "audible alert" can be used interchangeably herein.

Figure 2A:
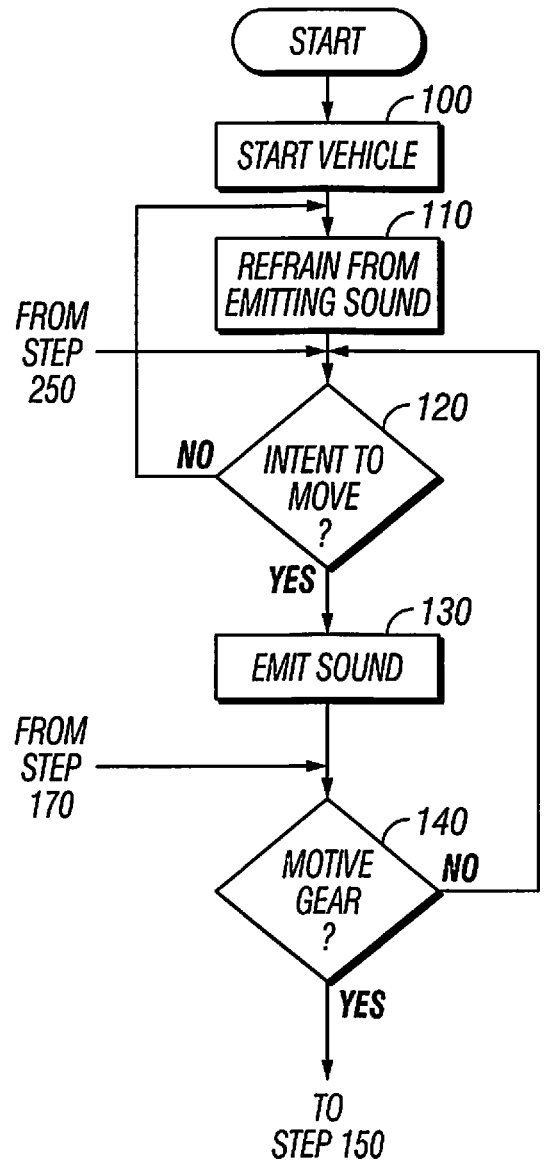
FIGS. 2A and 2B illustrate an exemplary process performed by the system shown in FIG. 1 to emanate the sound from the vehicle according to disclosed embodiments.
Figure 2B:
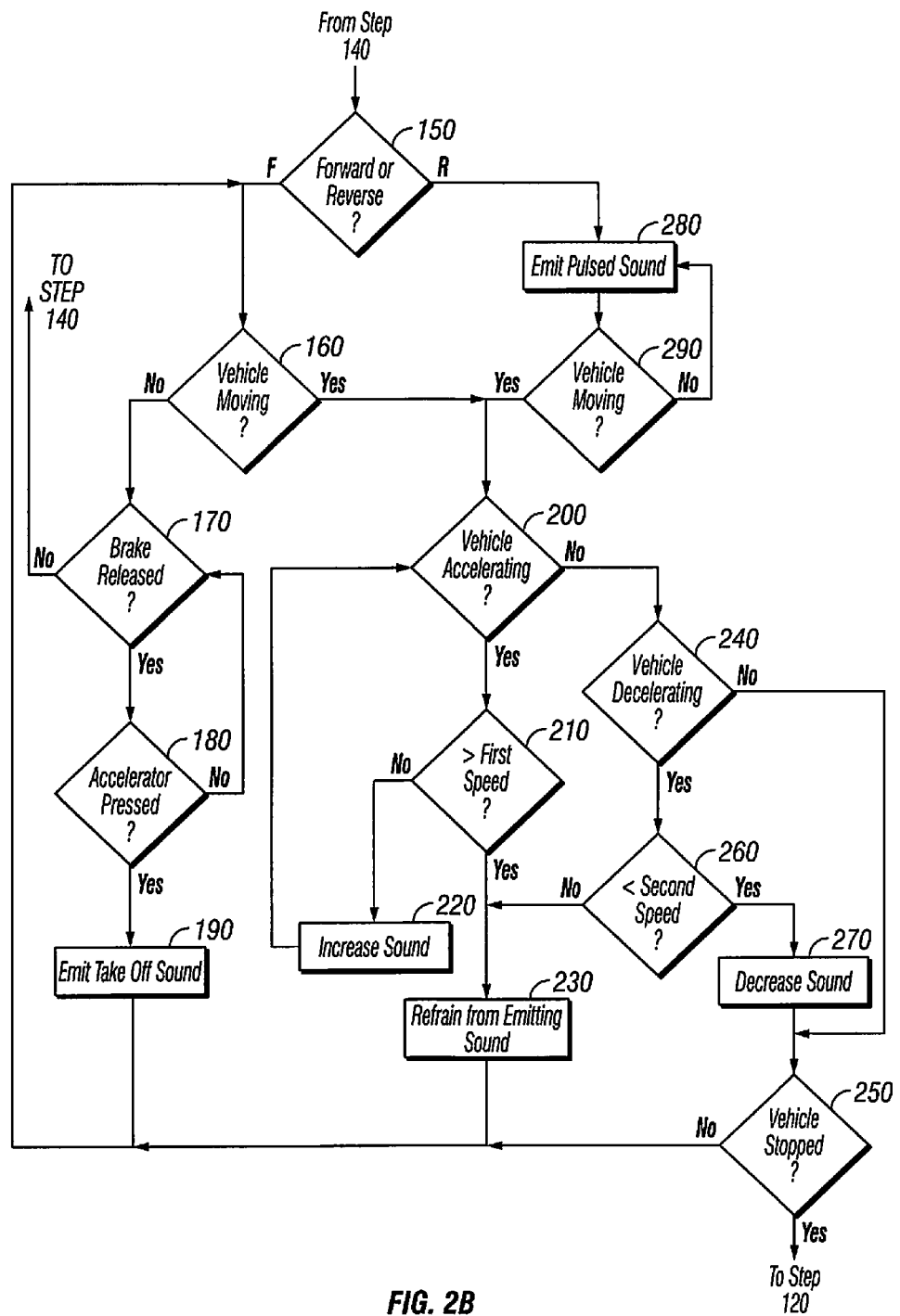

Specifically, the controller 14 controls the VSP module 16 to emanate a sound from the vehicle 12 according to the exemplary process as shown in FIGS. 2A and 2B and in the graphs as shown in FIGS. 3-6. For purposes of the embodiments described herein, the terms "continuously," "continuous" and any variations or synonyms thereof as used to modify terms such as "sound," "signal," "emanating", "emanate," "emit" and so on refer to the outputting or emanation of a sound profile, sound or signal in a manner that is perceptible as continuous (i.e., without pauses or gaps) by a human having normal hearing. In other words, for example, "continuously emanating a sound" refers to the continuous emanation of a sound, as well as the emanation of sound profile with pauses, gaps, dead spots, etc., in a manner such that the sound profile is perceived as a continuous sound profile by a human having normal hearing even though the actual emanation is not in fact continuous.

Figure 3:
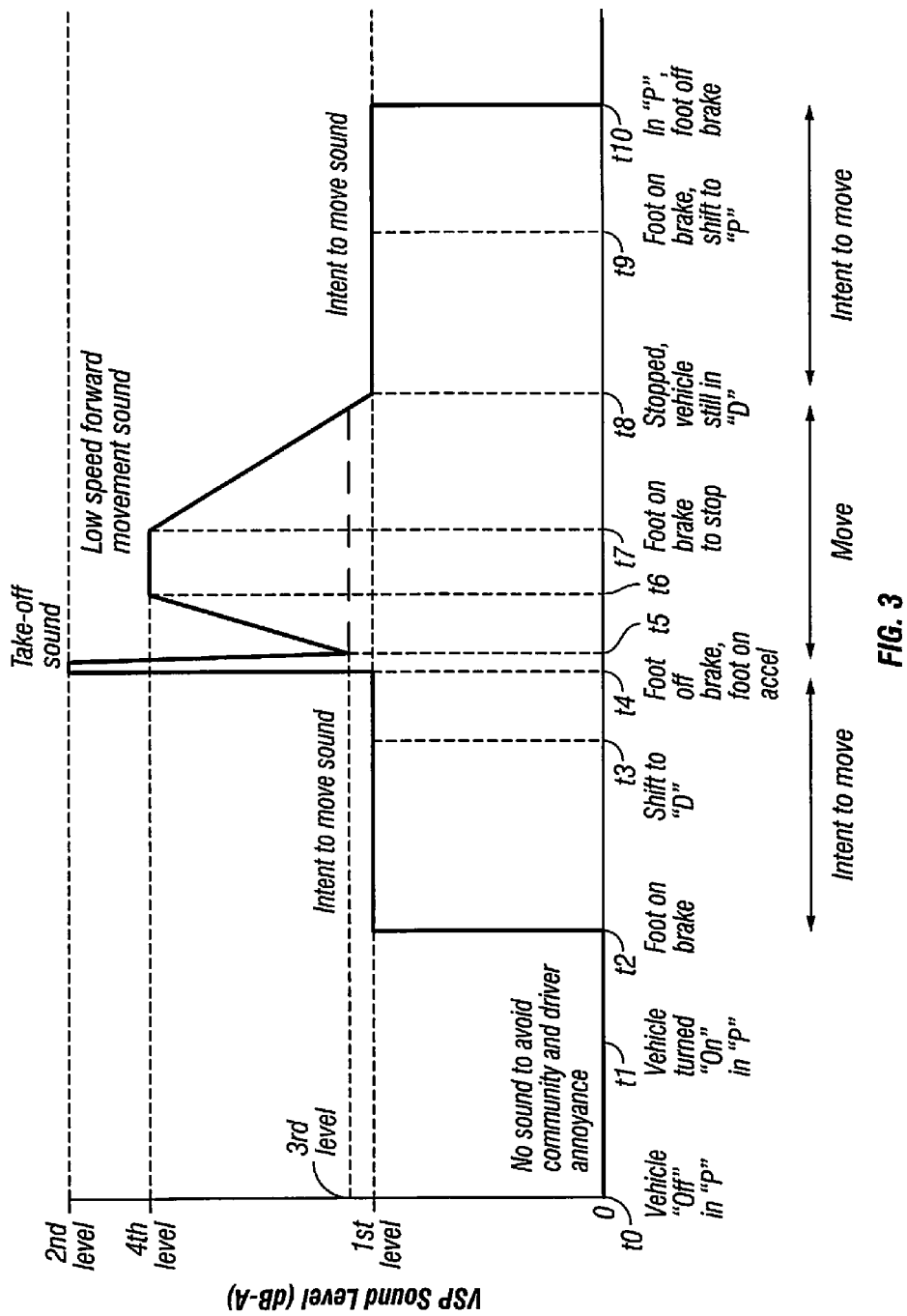
FIG. 3 is an exemplary graphical representation of the process shown in FIGS. 2A and 2B during vehicle forward movement at low speed.

As shown in FIGS. 2A and 2B, the process begins when the controller 14 determines based on signals from the start switch 18 (e.g., an ignition or starter) that the vehicle 12 is started from an "off" state to an "on" or running state in step 100. During the vehicle starting period, the controller 14 controls the VSP module 16 to refrain from emanating an audible alert sound from the audio component 30 in step 110. The vehicle starting period is shown as the period between times t0 and t1 in, for example, FIG. 3. FIG. 3 is an exemplary graphical representation of the process shown in FIGS. 2A and 2B during vehicle forward movement at low speed as discussed in more detail below.

The controller 14 then determines in step 120 whether a vehicle movement state indicates intent to move the vehicle 12 from a stationary state. The controller 14 can determine that the vehicle 12 is in a stationary state when, for example, the transmission state detector 26 indicates that the vehicle transmission is in a park position or in a neutral position, or the brake state detector 24 indicates the emergency brake is on. Naturally, the transmission can be an automatic transmission or a manual transmission as understood in the art. The controller 14 can also determine that the vehicle 12 is in a stationary state when, for example, the speed sensor 22 indicates that the vehicle 12 is not moving, regardless of the positions of the transmission, the brake and the emergency brake. When the vehicle 12 is in the stationary state, such as during the period between t1 and t2 in FIG. 3, the controller 14 continues to receive signals from the brake state detector 24 and the transmission state detector 26. The controller 14 can detect the vehicle movement state from, for example, at least a transmission state and a brake state of the vehicle 12. The controller 12 thus determines in step 120 whether the vehicle movement state indicates intent to move the vehicle 12 based on the transmission state and the brake state. If the brake has not been moved into the brake depressed state, the controller 14 controls the VSP module 16 to continue to refrain from emanating the sound. That is, the controller 14 controls the VSP module 16 to continue to refrain from emanating the sound in step 110 during a vehicle running state after the vehicle starting period and before a brake of the vehicle 12 is moved into a brake depressed state while the vehicle 12 is in a stationary state. In other words, the controller 14 controls the VSP module 16 to refrain from emanating the sound when the vehicle 12 is in the stationary state and the vehicle movement state fails to indicate intent to move the vehicle 12.

As can be appreciated from the above, the vehicle movement state indicates intent to maintain the vehicle stationary when the transmission state is a non-motive state and the brake state is a brake undepressed or released state. It should be noted that the terms undepressed or released can be used interchangeably. When the controller 14 determines in step 120 that, for example, the brake is moved into the brake depressed state (time t2 in FIG. 3), the controller 14 determines that the vehicle movement state indicates intent to move the vehicle 12 from the stationary state. In this example, the vehicle movement state indicates intent to move the vehicle 12 when the transmission state is a non-motive state, such as a vehicle park position or a vehicle neutral position, and the brake state is a brake depressed state. Accordingly, processing continues to step 130 where the controller 14 controls the VSP module 16 to emanate an audible alert from the audio component 30 at a first sound pressure level while the vehicle 12 is in the stationary state.

The controller 14 controls the VSP module 16 to continue emanating the audible alert from the audio component 30 while the controller 14 monitors the signals from the transmission state detector 26 in step 140. When the controller 14 determines based on the signals from the transmission state detector 26 that the transmission has not yet been moved to a motive state, the processing returns to step 120 to confirm that the vehicle movement state still indicates an intent to move. If the vehicle movement state still indicates an intent to move, the controller 14 controls the VSP module 16 to continue emanating the audible alert from the audio component 30 in step 130 and proceeds to step 140. If the vehicle movement state fails to indicate intent to move, the controller 14 controls the VSP module 16 to refrain from emanating the audible alert from the audio component 30 in step 110 and repeats as discussed above.

However, when the controller 14 determines based on the signals from the transmission state detector 26 that the transmission has been moved to a motive state (time t3 in FIG. 3), the processing continues to step 150. It should be noted that when the transmission state is a motive state and the brake state is any brake state, the vehicle movement state indicates intent to move the vehicle.

In step 150, the controller 14 determines whether the motive state is a vehicle forward movement position (e.g., a drive transmission position) or a vehicle reverse movement position (i.e., a reverse transmission position). As mentioned above, the transmission can be an automatic or manual transmission. Thus, for a manual transmission, the forward movement position could be any of the forward gear positions such as first gear, second gear, third gear and so on. If the controller 14 determines that the motive state is a vehicle forward movement position, the processing continues to step 160 where the controller 14 monitors the accelerator position sensor 20, the speed sensor 22, or both, to determine whether the vehicle 12 has begun to move. During this time, the controller 14 can control the VSP module 16 to continue to emanate the sound from the audio component 30 at the first sound pressure level while the transmission state is the motive state (e.g., forward motive state) and the brake state is the brake depressed state.

When the controller 14 determines in step 160 that the vehicle 12 is not moving, the controller 14 determines in step 170 whether the brake state is a brake released state. If the brake state is not a brake released state, the processing will return to step 140 as discussed above, and the controller 14 can control the VSP module 16 to continue to emanate the sound from the audio component 30 at the first sound pressure level. Assuming that the gear remains in the forward motive gear and the vehicle 12 is not moving, the processing will proceed through steps 140, 150 and 160 as discussed above. The controller 14 will continue to monitor the brake state and repeat the steps as discussed above. When the controller 14 determines in step 170 that the brake is in a brake released state, the processing continues to step 180.

In step 180, the controller 14 determines based on signals from the accelerator position sensor 20 whether the accelerator is in a depressed state. If the accelerator is not in a depressed state, the processing returns to step 170 and repeats as discussed above. That is, as long as the brake is in the brake released state, the processing will continue to step 180.

When the controller 14 determines in step 180 that the accelerator is in a depressed state and thus, the vehicle 12 will begin to move (time t4 in FIG. 3), the controller 14 controls the VSP module 16 to emanate a take off sound from the audio component 30 in step 190. For example, the controller 14 can control the VSP module 16 to emanate the take off sound at a second sound pressure level that is greater than the first sound pressure level upon first detecting that the brake state changes from the brake depressed state to the brake released state and then detecting that the accelerator state changes from a released state to a depressed state while the transmission state is the motive state and the vehicle 12 is in the stationary state (time t4 in FIG. 3).

After emitting the take off sound at the second sound pressure level for a predetermined period of time from when the accelerator state changes from the released state to the depressed state (time t4 in FIG. 3), the controller 14 can control the VSP module 16 to decrease the sound. That is, in step 190, the controller 14 can control the VSP module 16 to decrease the sound from the second sound pressure level to a decreased third sound pressure level that is below the second sound pressure level (time t5 in FIG. 3). The third sound pressure level can be equal to or greater than the first sound pressure level. The processing then returns to step 160.

Since the accelerator was or still is in the depressed state, the controller 14 will determine in step 160 that the vehicle 12 is moving. Thus, the processing will continue to step 200. In step 200, the controller 14 can monitor the signals from the accelerator position sensor 20, the signals from the speed sensor 22, or both, to determine whether the vehicle 12 is being accelerated. If the controller 14 determines that the vehicle 12 is being accelerated, the processing continues to step 210. In step 210, the controller 14 determines based on the signals from the speed sensor 22 whether the speed of the vehicle 12 is not above a predetermined speed (a first prescribed speed). As long as the speed of the vehicle 12 is at or below a predetermined speed, the processing continues to step 220 and the controller 14 controls the VSP module 16 to increase the sound pressure level in relation to the acceleration (or speed) of the vehicle 12. Therefore, as shown in FIG. 3, the sound pressure level increases to a fourth sound pressure level while the vehicle 12 is being accelerated. The fourth sound pressure level can be less than the second sound pressure level as shown, or can be any suitable level.

Thus, FIG. 3 illustrates operations that can occur when the vehicle 12 is traveling at a low speed, such as below 30 km/hr or any other suitable speed. In addition, the controller 14 can control the VSP module 16 to change a pitch of the sound in accordance with at least one of the position of the accelerator and the speed of the vehicle 12. Furthermore, the controller 14 can control the VSP module 16 to pulse the sound as discussed above with regard to FIG. 6 at any time that the sound is being emitted, and can vary the cadence of the pulsing as desired, such as in accordance with acceleration (or speed) of the vehicle 12.

When the controller determines in step 200 that the vehicle 12 is no longer being accelerated and is not moving at a speed above the first predetermined speed (time t6 in FIG. 3), the controller 14 can control the VSP module 16 to continue to emit the sound at the fourth sound pressure level. That is, if the controller 14 determines in step 200 that the vehicle 12 is not being accelerated, the controller 14 can monitor signals from the brake state detector 24, signals from the speed sensor 22, or both, in step 240 to determine whether the vehicle 12 is decelerating. If the controller 14 determines in step 240 that the vehicle 12 is not decelerating, the controller 14 can proceed to step 250 to determine whether the vehicle 12 is stopped based on, for example, the signals from the vehicle speed sensor 22. If the vehicle 12 is not stopped, the processing can return to step 160 and repeat as discussed above.

Therefore, although not shown explicitly in FIG. 3, the controller 14 can continue to monitor the position of the accelerator, the signals from the speed sensor 22, or both, in step 200 to determine whether the vehicle 12 is again accelerated. If the vehicle 12 is again being accelerated, the processing can return to step 210 to determine whether the vehicle 12 is not traveling above the predetermined speed. If the vehicle 12 is still not traveling above the predetermined speed, the processing continues to step 220 and the controller 14 can control the VSP module 16 to increase the pressure level of the emitted sound in relation to the acceleration of the vehicle 12.

The controller 14 also continues to monitor whether the vehicle 12 is being decelerated. That is, if the controller 14 determines in step 200 that the vehicle 12 is not being accelerated, the controller 14 can monitor signals from the brake state detector 24, signals from the speed sensor 22, or both, in step 240. If the controller 14 determines in step 240 that the vehicle 12 is decelerating, the controller 14 can determine in step 260 whether the speed of the vehicle 12 is below a second prescribed speed. Presumably, for this example where the vehicle 12 is traveling at a low speed, such as below 30 km/hr or any other suitable speed, the speed of the vehicle 12 will be below the second prescribed speed. The second prescribed speed can be equal to or about equal to the first prescribed speed (e.g., 30 km/hr, 25 km/hr or any other suitable speed).

Accordingly, if the controller 14 determines in step 260 that the vehicle 12 is travelling below the second prescribed speed, the processing continues to step 270. In step 270, the controller 14 will control the VSP module 16 to gradually decrease the pressure level of the emitted sound from the fourth sound pressure level (time t7 in FIG. 3).

The controller 14 then determines in step 250 whether the vehicle 12 is stopped based on, for example, the signals from the vehicle speed sensor 22. As discussed above, if the vehicle 12 is not stopped, the processing can return to step 160. Assuming that the vehicle 12 is moving (step 160), the vehicle 12 is not accelerating (step 200), the vehicle 12 is decelerating (step 240) and the speed of the vehicle 12 is below the second prescribed speed (step 260), the controller 14 can control the VSP module 16 to continue to decrease the pressure level of the emitted sound from the fourth sound pressure level (or increased pressure level) to the first sound pressure level or any other suitable pressure level in step 270. The processing then can repeat as discussed above as long as the vehicle 12 is not stopped.

When the controller 14 determines in step 250 that the vehicle 12 is stopped (time t8 in FIG. 3), the processing returns to step 120 as discussed above. Thus, in step 120, the controller 14 will determine whether the vehicle movement state indicates intent to move the vehicle 12 as discussed above. For example, the controller 14 will monitor signals from the brake state detector 24 and the transmission state detector 26 to determine whether the transmission has been moved to a non-motive state and the brake is in the depressed state, or the transmission remains in a motive state. If the controller 14 determines in step 120 that, for example, the transmission has not been moved to a non-motive state such as park or neutral (time t9 in FIG. 3) and the brake is still in the depressed state, or the transmission remains in a motive state, the controller 14 will determine that the vehicle movement state still indicates intent to move the vehicle 12. Accordingly, the controller 14 will control the VSP module 16 to continue to emit sound from the audio component 30 at the first sound pressure level in step 130. If the controller 14 determines in step 140 that the transmission is still in the motive gear, the processing proceeds to step 150 and repeats as discussed above.

Furthermore, when the controller 14 determines in step 140 that the transmission is in the non-motive state, the controller 14 will determine in step 120 whether the vehicle movement state still indicates intent to move the vehicle 12 in the manner as discussed above. However, when the controller 14 determines in step 140 that the transmission is in the non-motive state and then determines in step 120 the brake is in the released state, the controller 14 will thus determine in step 120 that the vehicle movement state does not indicate intent to move the vehicle 12. Therefore, the controller 14 will control the VSP module 16 in step 110 to discontinue emitting the sound (time t10 in FIG. 3). In other words, the controller 14 controls the VSP module 16 to cease emanating the sound when the vehicle returns to the stationary state after moving, the transmission state enters a non-motive state and the brake state enters a released state, in which event the vehicle movement state indicates intent to maintain the vehicle 12 stationary.

The process then repeats as discussed above. Naturally, if the vehicle 12 is turned off, the process repeats at step 100 when the vehicle 12 is turned on again.

Also, instead of the controller 14 controlling the VSP module 16 in step 220 to increase the sound pressure level, the controller 14 can instead control the VSP module 16 to maintain the sound pressure level at the third sound pressure level as shown in broken line in FIG. 3, or at any other suitable sound pressure level, during vehicle acceleration as long as the speed of the vehicle 12 is at or below a predetermined speed. As stated above, the third sound pressure level can be at or above the first sound pressure level, but is below the second sound pressure level of the take off sound. The processing otherwise is performed as described above with regard to FIG. 3. Thus, when the processing continues to step 270, the controller 14 controls the VSP module 16 to gradually decrease the pressure level of the emitted sound from the third sound pressure level to the first sound pressure level (similar to time t7 in FIG. 3). Naturally, if the third pressure level is the same as the first pressure level, no such decrease needs to be performed, and the processing can continue as discussed above with regard to FIG. 3.

Figure 4:
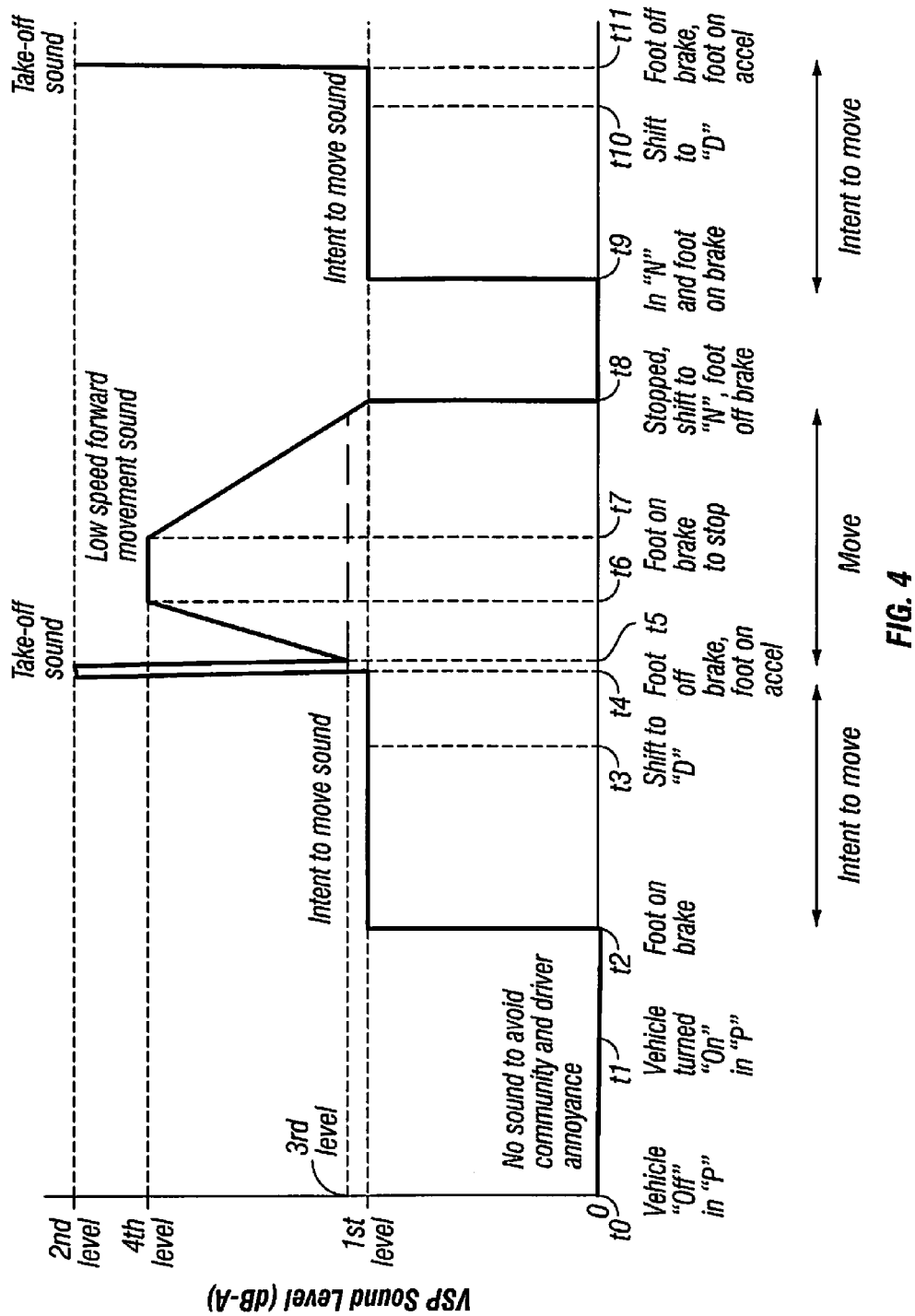
FIG. 4 is a variation to the graphical representation shown in FIG. 3 illustrating exemplary operations that can be performed when the vehicle movement state does not indicate an intent to move the vehicle at or about the time that the vehicle comes to a stop.

FIG. 4 is identical to FIG. 3, except that FIG. 4 illustrates an example of operations that can be performed when the controller 14 determines in step 120 that the vehicle movement state does not indicate intent to move the vehicle 12 when the vehicle 12 comes to a stop at time t8. That is, in step 140 of the flowchart in FIGS. 2A and 2B, the controller 14 detects based on signals from the transmission state detector 26 that the transmission has been moved to a non-motive state such as park or neutral at or proximate to the time that the vehicle 12 has come to a stop. The controller 14 also detects in step 120 based on signals from the brake state detector 24 that the brake is in the released state at or proximate to the time that the vehicle 12 has come to a stop and the transmission has been moved to the non-motive state.

Accordingly, as shown in FIG. 4, the controller 14 will control the VSP module 16 in step 100 to discontinue emitting the sound at or proximate to time t8 in FIG. 4. The processing then repeats as discussed above. Therefore, the controller 14 controls the VSP module 16 to refrain from emanating the sound (an audible alert) from the audio component 30 in step 110. However, once the controller 14 determines in step 120 that the vehicle movement state indicates intent to move the vehicle 12, the controller 14 controls the VSP module 16 to emanate the sound at the first sound pressure level (time t9 in FIG. 4) and performs the operations as discussed above. Accordingly, the times indicated at t10 and t11 in FIG. 4 correspond to times t2 and t3, respectively, as shown in FIGS. 3 and 4.

Furthermore, as with the operations in FIG. 3, the controller 14 can control the VSP module 16 to maintain the sound pressure level at the third sound pressure level as shown in broken line in FIG. 4, or at any other suitable sound pressure level, during vehicle acceleration as long as the speed of the vehicle 12 is at or below a predetermined speed. The processing otherwise is performed as described above with regard to FIG. 4. Thus, when the processing continues to step 270, the controller 14 controls the VSP module 16 to gradually decrease the pressure level of the emitted sound from the third sound pressure level to the first sound pressure level (similar to time t7 in FIG. 4). Naturally, if the third pressure level is the same as the first pressure level, no such decrease needs to be performed, and the processing can continue as discussed above with regard to FIG. 4.

Figure 5:
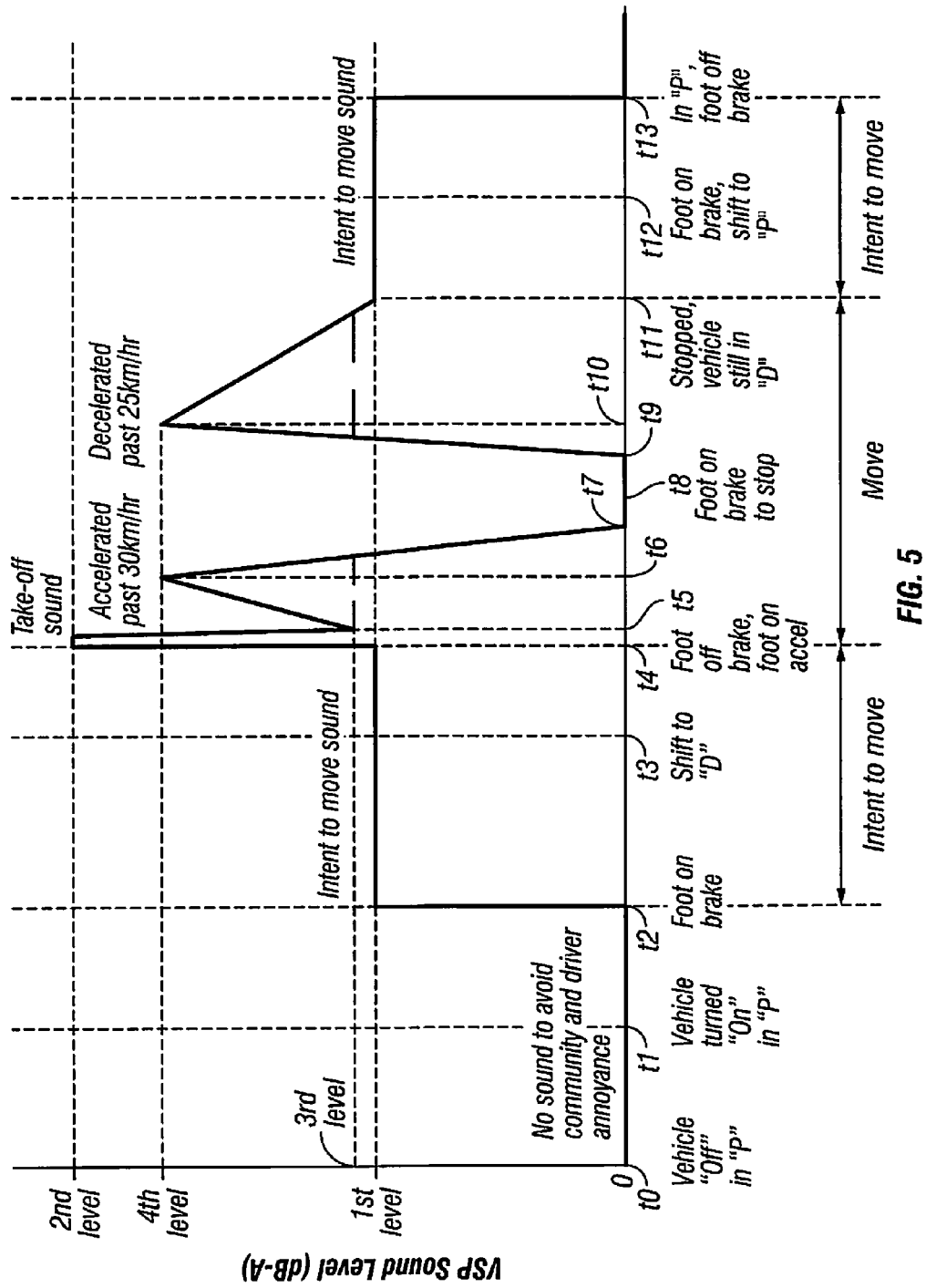
FIG. 5 is a variation to the graphical representation shown in FIG. 3 illustrating exemplary operations that can be performed when the speed of the vehicle reaches a predetermined speed.

As discussed above with regard to step 210 shown in the flowchart of FIGS. 2A and 2B, the controller 14 determines in step 210 whether the speed of the vehicle 12 is below the first prescribed speed. FIG. 5 illustrates an exemplary graph of operations that the controller 14 can perform when the speed of the vehicle 12 reaches the first prescribed speed. The graph shown in FIG. 5 from times t0 through t6 generally corresponds to the graph shown in FIG. 3 from times t0 through t6. However, in FIG. 5, time t6 indicates the sound pressure level when the vehicle 12 reaches the first prescribed speed.

As shown in the flowchart of FIGS. 2A and 2B, when the controller 14 determines in step 210 that the speed of the vehicle 12 is above the first prescribed speed, the processing proceeds to step 230. In this example, the first prescribed speed can be 30 km/hr or any other suitable speed as discussed above. That is, as understood in the art, when the vehicle 12 is traveling at or above 25 km/hr, the noise naturally produced by the vehicle 12, such as road noise and so on, is sufficient enough to be detected by pedestrians, so the VSP sound is no longer needed at those speeds.

In step 230, the controller 14 controls the VSP module 16 to gradually decrease or fade out the sound pressure level of the emitted sound until time t7 shown in FIG. 5 when the VSP module 16 ceases to emit the sound. The processing then returns to step 160 and repeats as discussed above. When the controller 14 determines in step 200 that the vehicle 12 is not accelerating, the processing continues to step 240 where the controller 14 determines whether the vehicle 12 is decelerating. If the vehicle 12 is decelerating, the processing continues to step 260 where the controller 14 determines whether the vehicle 12 continues to travel at or above the second prescribed speed. In this example, the second prescribed speed can be 25 km/hr or slightly below the first prescribed speed as discussed above. Naturally, the first and second prescribed speeds can be equal to each other or any suitable speeds. While the vehicle 12 is traveling at or above the second prescribed speed, the controller 14 controls the VSP module 16 in step 230 to continue to refrain from emitting the sound.

As further shown in the example of FIG. 5, the accelerator is released and the brake is pressed and enters the brake depressed state at time t8. Therefore, the speed of the vehicle 12 begins to decrease. When the controller 14 determines in step 260 that the speed of the vehicle 12 has dropped to below the second prescribed speed (time t9 in FIG. 5), the controller 14 controls the VSP module 16 to gradually increase or fade in the sound pressure level of the emitted sound in step 270 until the VSP module 16 emits the sound at the fourth sound pressure level (or any other suitable sound pressure level) as discussed above.

The processing thus continues to step 250 as discussed above. If the vehicle 12 is not stopped, the processing returns to step 160 and repeats. Since the controller 14 determines in step 240 that the vehicle 12 is decelerating because, for example, the brake is determined to be in the brake depressed state and thus the speed sensor 22 indicates that the vehicle speed is decreasing, the controller 14 controls the VSP module 16 to decrease the sound pressure level in step 270 (time t10 in FIG. 5) to the first sound pressure level until the vehicle 12 is determined to be stopped in step 250 as discussed above. When the controller 14 determines in step 250 that the vehicle 12 is stopped (time t11 in FIG. 5), the processing returns to step 120 where the controller 14 will determine whether the vehicle movement state indicates intent to move the vehicle 12 as discussed above. If the controller 14 determines in step 120 that the vehicle movement state still indicates intent to move the vehicle 12, the controller 14 will control the VSP module 16 to continue to emit sound in step 130. Furthermore, if the controller 14 determines in step 140 that the transmission has been moved to a non-motive state such as park or neutral (time t12 in FIG. 5) and the brake is still in the depressed state, the controller 14 will return to step 120 and determine that the vehicle movement state still indicates intent to move the vehicle 12. Accordingly, the controller 14 will control the VSP module 16 to continue to emit sound from the audio component 30 at the first sound pressure level in step 130. However, when the controller 14 determines in step 140 that the transmission is in the non-motive state and determines in step 120 that the brake is in the released state, the controller 14 will determine that the vehicle movement state does not indicate intent to move the vehicle 12. Therefore, the controller 14 will control the VSP module 16 in step 110 to discontinue emitting the sound (time t13 in FIG. 5).

The process then repeats as discussed above. Naturally, if the vehicle 12 is turned off, the process repeats at step 100 when the vehicle 12 is turned on again.

Furthermore, as with the operations in FIGS. 3 and 4, the controller 14 can control the VSP module 16 to maintain the sound pressure level at the third sound pressure level as shown in broken line in FIG. 5, or at any other suitable sound pressure level, during vehicle acceleration as long as the speed of the vehicle 12 is at or below a predetermined speed (times t5 through t6). The processing otherwise is performed as described above with regard to FIG. 5. Thus, in step 230, the controller 14 controls the VSP module 16 to gradually decrease or fade out the sound pressure level of the emitted sound from the third sound pressure level until time t7 shown in FIG. 5 when the VSP module 16 ceases to emit the sound. The processing then returns to step 160 and repeats as discussed above. When the controller 14 determines in step 260 that the speed of the vehicle 12 has dropped to below the second prescribed speed (time t9 in FIG. 5), the controller 14 controls the VSP module 16 to gradually increase or fade in the sound pressure level of the emitted sound in step 270 until the VSP module 16 emits and maintains the sound at the third sound pressure level (or any other suitable sound pressure level) as discussed above. When the processing continues to step 270, the controller 14 controls the VSP module 16 to gradually decrease the pressure level of the emitted sound from the third sound pressure level to the first sound pressure level (similar to time t10 in FIG. 4). Naturally, if the third pressure level is the same as the first pressure level, no such decrease needs to be performed, and the processing can continue as discussed above with regard to FIG. 5.

Figure 6:
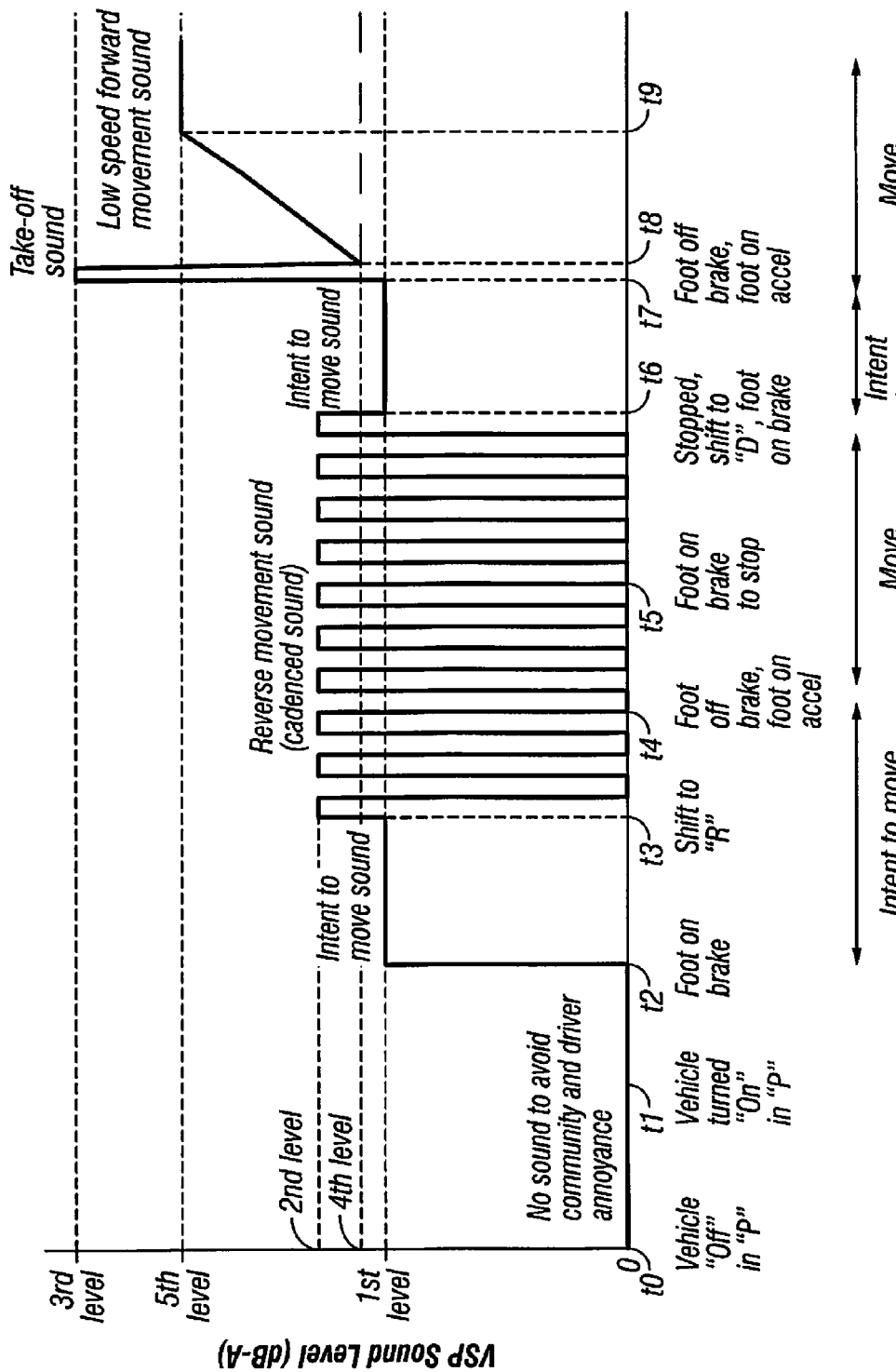
FIG. 6 is an exemplary graphical representation of the process shown in FIGS. 2A and 2B during vehicle reverse movement.

As discussed above with regard to FIGS. 2A and 2B, the controller 14 determines in step 150 whether the motive state is a vehicle forward movement position (e.g., a drive transmission position or any forward motive gear position) or a vehicle reverse movement position (i.e., a reverse transmission position). If the controller 14 determines that the motive state is a vehicle reverse movement position, the processing continues to step 280 where the controller 14 controls the VSP module 16 to emit a reverse movement sound as shown in FIG. 6. FIG. 6 illustrates an exemplary graph of operations that the controller 14 can perform when the motive state is a vehicle reverse movement position. The graph shown in FIG. 6 from times t0 through t3 generally corresponds to the graph shown in FIG. 3 from times t0 through t3. However, in FIG. 6, time t3 indicates the time that the controller 14 determines that the motive state is a vehicle reverse movement position.

Accordingly, in step 280, the controller 14 controls the VSP module 16 to emanate the sound, including pulsing the sound when the vehicle movement state indicates intent to move the vehicle 12 and the transmission state is a vehicle reverse movement position. The controller 14 can control the VSP module 16 to pulse the sound between zero and a second level, or between a level greater than zero and the second level. The second level can be greater than or equal to the first level, for example, or the fourth level shown in FIG. 6 which is discussed below. Also, while the transmission is in the vehicle reverse movement position, the controller 14 can continue to detect signals from accelerator position sensor 20, the speed sensor 22, the brake state detector 24 and the transmission state detector 26. Thus, when the controller 14 determines in step 290 that the vehicle 12 is still stationary, the controller 14 can control the VSP module 16 to continue to pulse the sound in step 280.

However, when the brake is in the brake released state and the controller 14 determines, for example, from the speed sensor 22 or the accelerator position sensor 20 that the accelerator is in the accelerator depressed state and the vehicle 12 is thus moving (time t4 in FIG. 6), the processing can continue to step 200 and repeat as discussed above. In other words, although not shown explicitly in FIG. 6, the controller 14 can change the peak sound pressure (volume) of the emitted sound based on the acceleration (or speed) of the vehicle 12 in the reverse direction in a manner similar to that described above with regard to the forward movement of the vehicle 12. The controller 14 can still control the VSP module 16 to continue to pulse the sound even during this increase and decrease in peak sound pressure based on acceleration and deceleration of the vehicle 12. Naturally, the controller 14 can change the rate of pulsing (e.g., increase or decrease the rate of pulsing or cadence rate) when the vehicle 12 is being accelerated or decelerated in the reverse direction. Of course, the controller 14 can alternatively control the VSP module 16 to continue to pulse the sound between the same levels (volumes) and at the same pitch and cadence regardless of the acceleration and deceleration of the vehicle 12 as shown in FIG. 6.

While repeating the operations shown in FIGS. 2A and 2B in a manner similar to that for the forward movement of the vehicle 12 as discussed above, the controller 14 can determine that the brake is in the brake depressed state (time t5 in FIG. 6) and the vehicle 12 is stopped (time t6 in FIG. 6). The controller 14 can thus determine whether the transmission position has changed in steps 140 and 150 as discussed above. If the transmission position has not changed from the reverse vehicle position, the controller 14 will control the VSP module 16 to continue to pulse the sound as discussed above. However, if the controller 14 determines in step 150 that the transmission position has changed to, for example, a vehicle forward movement position, the processing will proceed to step 160 and repeat as discussed above. As indicated, times t6, t7, t8 and t9 in FIG. 6 generally correspond to times t3, t4, t5 and t6, respectively, in FIG. 3. Thus, the operations performed at times t6, t7, t8 and t9 in FIG. 6 generally correspond to the operations performed at times t3, t4, t5 and t6, respectively, in FIG. 3 as discussed above. Also, the third, fourth and fifth sound levels shown in FIG. 6 generally correspond with the second, third and fourth sound levels, respectively, shown in FIG. 3. Naturally, as discussed above with regard to FIGS. 3-5, the controller 14 can control the VSP module 16 to maintain the sound pressure level at the fourth sound pressure level as shown in broken line in FIG. 6, or at any other suitable sound pressure level, during vehicle acceleration as long as the speed of the vehicle 12 is at or below a predetermined speed.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also, the term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A method of emanating a sound from a vehicle comprising:
    detecting a speed of the vehicle;
    emanating a speed sound, including emanating a sound profile and changing at least one of a sound pressure level and a pitch of the sound profile in relation to the speed of the vehicle changing;
    ceasing emanation of the speed sound upon the speed of the vehicle increasing from below a first threshold to above the first threshold;
    refraining from emanating the speed sound upon the speed of the vehicle decreasing from above the first threshold to a decreased speed which is below the first threshold and above a second threshold which is less than the first threshold; and
    resuming emanation of the speed sound upon the speed of the vehicle decreasing from the decreased speed above the second threshold to below the second threshold.

2. A method of emanating a sound from a vehicle comprising:
    detecting a speed of the vehicle;
    emanating a speed sound, including emanating a sound profile and changing at least one of a sound pressure level and a pitch of the sound profile in relation to the speed of the vehicle changing;
    ceasing emanation of the speed sound upon the speed of the vehicle increasing from below a first threshold to above the first threshold;
    resuming emanation of the speed sound upon the speed of the vehicle decreasing from above a second threshold to below the second threshold, the second threshold being less than the first threshold;

detecting an accelerator state, a brake state, and a transmission state of the vehicle; and emanating a take-off sound, which includes changing emanation of the sound profile from a first sound pressure level to a second sound pressure level that is greater than the first sound pressure level, upon first detecting the accelerator state transitioned from an accelerator released state to an accelerator depressed state while the brake state indicates the brake released state and the transmission state indicates a motive state.

3. The method according to claim 2, wherein the emanation of the speed sound is subsequent to the emanation of the take-off sound.

4. The method according to claim 3, wherein the emanation of the speed sound subsequent to the emanation of the take-off sound includes emanating the sound profile between a third sound pressure level in relation to a minimum speed, the third sound pressure level being greater than the first sound pressure level, and a fourth sound pressure level in relation to the first threshold, the fourth sound pressure level being greater than the third sound pressure level.

5. The method according to claim 3, wherein the resuming emanation of the speed sound includes emanating the sound profile between the fourth sound pressure level in relation to the second threshold, and the first sound pressure level in relation to the minimum speed.

6. The method according to claim 2, wherein the emanating of the take-off sound includes immediately changing the emanation of the sound profile from the second sound pressure level to a third sound pressure level that is less than the second sound pressure level.

7. The method according to claim 2, further comprising:

detecting a vehicle movement state; and prior to emanating the take-off sound, emanating an intent-to-move sound, which includes emanating the sound profile steadily at the first sound pressure level, upon first detecting the brake state transitioned from a brake released state to a brake depressed state while the vehicle movement state indicates a stopped state and the transmission state indicates a non-motive state.

8. The method according to claim 7, further comprising:

detecting a vehicle ON-OFF state;

refraining from emanating the sound profile during a vehicle starting period in which the vehicle ON-OFF state transitions from an OFF state to an ON state;

refraining from emanating the sound profile while the vehicle ON-OFF state is in the ON state after the vehicle starting period, the brake state is a brake released state, and the vehicle movement state is a stationary state; and emanating the intent-to-move sound when the brake state transitions from the brake released state to a brake depressed state while the vehicle movement state is the stationary state.

9. The method according to claim 7, wherein the emanating the intent-to-move sound includes continuing to emanate the sound profile at while the brake state remains the brake depressed state, the vehicle movement state indicates a stationary state, and the transmission state indicates any state.

10. The method according to claim 7, further comprising:

emanating the intent-to move sound upon first detecting the vehicle movement state transitioned from a moving state to a stationary state while the brake state indicates the brake depressed state, and the transmission state indicates a motive state.

11. The method according to claim 7, further comprising:

ceasing emanating the intent-to-move sound upon first detecting the brake state transitioned from the brake depressed state to the brake released state while the vehicle movement state indicates a stationary state and the transmission state indicates a non-motive state.

12. The method according to claim 7, further comprising:

emanating the intent-to-move sound when the vehicle movement state transitions from a motive state to a stationary state and the brake state remains in the brake depressed state.

13. The method according to claim 12, wherein the motive state is a forward movement state.

14. The method according to claim 2, further comprising:

emanating a reverse sound including pulsing the sound pressure level of the sound profile when the transmission state indicates a vehicle reverse movement state while the brake state indicates any state and the vehicle movement state indicates any state.

15. The method according to claim 1, wherein the emanation of the speed sound includes emanating the sound profile between a first sound pressure level in relation to a minimum speed, and a second sound pressure level in relation to the first threshold, the second sound pressure level being greater than the first sound pressure level.

16. The method according to claim 1, further comprising:

detecting an accelerator state, a brake state, and a transmission state of the vehicle; and emanating an intent-to-move sound including emanating the sound profile at a first sound pressure level when the speed of the vehicle decreased from the below the second threshold to indicating the vehicle is stopped, while the accelerator state indicates an accelerator released state, the brake state indicates a brake depressed state, and the transmission state indicates a motive state.

17. A vehicle sound emanating system comprising:

an speed detector configured to detect a speed of a vehicle;

an audio component controllable to emanate a sound profile; and a controller configured to control the audio component to emanate a speed sound, which includes emanating a sound profile and changing at least one of a sound pressure level and a pitch of the sound profile in relation to the speed of the vehicle changing, ceasing emanation of the speed sound upon the speed of the vehicle increasing from below a first threshold to above the first threshold, refraining from emanating the speed sound upon the speed of the vehicle decreasing from above the first threshold to a decreased speed which is below the first threshold and above a second threshold which is less than the first threshold, and resuming emanation of the speed sound upon the speed of the vehicle decreasing from the decreased speed above the second threshold to below the second threshold.

18. The vehicle sound emanating system according to claim 17, further comprising:

an acceleration position sensor configured to detect an accelerator state of the vehicle;

a brake state detector configured to detect a brake state of the vehicle; and a transmission state detector configured to detect a transmission state of the vehicle; and wherein the controller is further configured to control the audio component to emanate a take-off sound, which includes changing emanation of the sound profile from a first sound pressure level to a second sound pressure level that is greater than the first sound pressure level, upon first detecting the accelerator state transitioned from an accelerator released state to an accelerator depressed state while the brake state indicates the brake released state and the transmission state indicates a motive state.

19. The vehicle sound emanating system according to claim 18, wherein
the emanation of the speed sound is subsequent to the emanation of the take-off sound.

20. The vehicle sound emanating system according to claim 17, further comprising:

an acceleration position sensor configured to detect an accelerator state of the vehicle;

a brake state detector configured to detect a brake state of the vehicle; and a transmission state detector configured to detect a transmission state of the vehicle; and wherein the controller is further configured to control the audio component to emanate an intent-to-move sound including emanating the sound profile at a first sound pressure level when the speed of the vehicle decreased from the below the second threshold to indicating the vehicle is stopped, while the accelerator state indicates an accelerator released state, the brake state indicates a brake depressed state, and the transmission state indicates a motive state.

* * * * *